United States Patent Office 2,794,024
Patented May 28, 1957

2,794,024

NEW ALKYLAMINOBENZOIC ACID ESTERS AND SALTS THEREOF AND A PROCESS OF PREPARING THEM

Gustav Ehrhart, Burgberg, Bad Soden, and Leonhard Stein, Bad Soden, Germany, assignors to Farbwerke Hoechst Aktiengesellschaft vormals Meister Lucius & Bruning, Frankfurt am Main Hochst, Germany, a company of Germany No Drawing. Application June 29, 1953,
Serial No. 364,912

Claims priority, application Germany December 28, 1950

13 Claims. (Cl. 260—326.3)

The present invention relates to new alkylaminobenzoic acid esters and salts thereof and to a process of preparing them.

In U. S. patent specification No. 1,550,350 are described processes of making alkylamino esters of N-monoalkylated derivatives of the para-aminobenzoic acid, which consist in esterifying a para-N-monoalkylaminobenzoic acid by one of the usual methods with an alkylamine or by treating an alkylamino ester of para-aminobenzoic acid with an alkylating agent. The compounds thus obtained are valuable agents for producing regional anaesthesia, but they are also suitable for surface anaesthesia.

In German patent specification No. 179,627 is described a process of producing para-aminobenzoic acid alkylamino esters which consists in the reduction of the corresponding para-nitrobenzoic acid esters. Moreover, in said specification compounds are described which still contain a hydroxy-group in the alkyl group carrying the tertiary nitrogen atom. Just as the para-aminobenzoic acid ester of the diaminoethanol, the afore-named compounds are only regional anaesthetics, but they cannot be used for surface anaesthesia.

In U. S. patent specification No. 1,711,696 are described para-aminobenzoic acid esters of alpha-hydroxy-beta-alkoxy-gamma-amino-propanes. These compounds, too, are merely suitable for regional anaesthesia, since their stimulating effect is still very considerable so that they cannot be used as surface anaesthetics.

Now we have found that new valuable compounds are obtained by condensing a 1-aminopropane-diol corresponding to the general formula

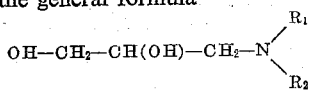

wherein $R_1$ and $R_2$ each represent hydrogen, or an alkyl, cycloalkyl, alkoxyalkyl or aralkyl group, or

represents the residue of a 5-membered or 6-membered heterocyclic ring system, in the presence of a metal alcoholate, with a derivative of aminobenzoic acid corresponding to the general formula

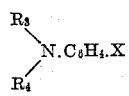

wherein X represents a carboxylic acid, carboxylic acid ester or carboxylic acid halide group, $R_3$ represents hydrogen, or an alkyl group and $R_4$ represents an alkyl group, or by carrying out the condensation with a corresponding derivative of nitrobenzoic acid, then reducing the condensation product, alkylating the reduction product in the amino group bound to the phenyl nucleus and, if required, splitting off by reduction any benzyl group which may be present in the aliphatic amino group.

The compounds thus obtained correspond to the general formula

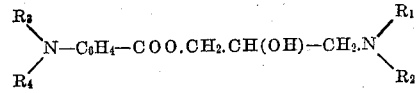

wherein $R_1$, $R_2$, $R_3$ and $R_4$ have the meanings given above.

As 1-aminopropane-diols there may be mentioned, for example:

1-amino-propane-diol-(2.3)
1-methylamino-propanediol-(2.3)
1-ethylamino-propanediol-(2.3)
1-propylamino-propanediol-(2.3)
1-butylamino-propanediol-(2.3)
1-isopropylamino-propanediol-(2.3)
1-isobutylamino-propanediol-(2.3)
1-pentylamino-propanediol-(2.3)
1-hexylamino-propanediol-(2.3)
1-dimethylamino-propanediol-(2.3)
1-diethylamino-propanediol-(2.3)
1-dipropylamino-propanediol-(2.3)
1-dibutylamino-propanediol-(2.3)
1-di-isopropylamino-propanediol-(2.3)
1-di-isobutylamino-propanediol-(2.3)
1-N-methyl-N-ethylamino-propanediol-(2.3)
1-N-methyl-N-butylamino-propanediol-(2.3)
1-di-(methyloxyethyl)-amino-propanediol(2.3)
1-propylbenzylamino-propanediol-(2.3)
1-N-cyclohexyl-N-methylamino-propanediol-(2.3)
1-N-cyclohexyl-N-ethylamino-propanediol(2.3)
1-cyclohexylbenzylamino-propanediol-(2.3)
1-benzylmethylamino-propanediol-(2.3)
1-benzylethylamino-propanediol-(2.3)
1-dibenzylamino-propanediol-(2.3)
1-pyrrolidino-propanediol-(2.3)
1-piperidino-propanediol-(2.3) or
1-morpholino-propanediol-(2.3)

As aminobenzoic acid derivatives there may, for example, be named:

Ortho-, meta- and para-methylaminobenzoic acid ethyl ester
Ortho-, meta- and para-ethylaminobenzoic acid ethyl ester
Ortho-, meta- and para-propylaminobenzoic acid ethyl ester
Ortho-, meta- and para-butylaminobenzoic acid ethyl ester
Ortho-, meta- and para-isobutylaminobenzoic acid ethyl ester
Ortho-, meta- and para-isopropylaminobenzoic acid ethyl ester
Ortho-, meta- and para-diethylaminobenzoic acid ethyl ester
Ortho-, meta- and para-dimethylaminobenzoic acid ethyl ester
Ortho-, meta- and para-dipropylaminobenzoic acid ethyl ester
Ortho-, meta- and para-di-isopropylaminobenzoic acid ethyl ester
Ortho-, meta- and para-dibutylaminobenzoic acid ethyl ester
Ortho-, meta- and para-di-isobutylaminobenzoic acid ethyl ester, or
Ortho-, meta- and para-nitro-benzoic acid ethyl ester Instead of the benzoic acid ethyl esters there may be used in the same manner other benzoic acid lower alkyl esters, for example, methyl, propyl, isopropyl, butyl, amyl and similar esters.

The new compounds obtained by the process of the invention are distinguished by an excellent local anaesthetic action, they are non-irritant and are especially suitable for surface anaesthesia, particularly in ophthalmology. In comparison with the para-N-butylamino-benzoic acid ester of dimethyl-amino-ethanol, they are less toxic, completely non-irritant and have a very favorable therapeutic index. In comparison with the compounds known from U. S. patent specification No. 1,711,696 which contain a free amino-group in the phenyl radical and an alkoxylated OH-group in the alkyl chain they are distinguished, in addition to the advantage of a non-stimulating action, by an essentially longer lasting effect.

The following examples serve to illustrate the invention, but they are not intended to limit it thereto:

Example 1

20 grams of para-propylamino-benzoic acid ethyl ester and 20 grams of 1-dimethylamino-propane-diol-(2.3) are heated for 2 hours at 120° C. with 2 cc. of sodium methylate solution of 5 percent strength. The excess of 1-dimethylamino-propane-diol-(2.3) is distilled and the residue is then taken up in dilute hydrochloric acid, filtered and rendered alkaline with potassium carbonate. The oil which separates is taken up in ether. The ether solution is dried and the excess of ether is distilled. A solid base remains behind, and is converted into its hydrochloride by means of alcoholic hydrochloric acid.

After the recrystallization from methanol and ether, the hydrochloride of para-propylamino-benzoic acid alpha-dimethyl-amino-beta-hydroxypropyl ester is obtained in a good yield. The product melts at 114° C.–116° C. After drying under reduced pressure, the hydrochloride melts at 134° C.–136° C.

Example 2

Equimolecular proportions of para-propylamino-benzoic acid ethyl ester and 1-pyrrolidino-propane-diol-(2.3) are heated for 2 hours to 120° C., with the addition of a small quantity of sodium methylate solution of 5 percent strength. The residue so obtained is dissolved in dilute acetic acid, and the solution is shaken with ether. The aqueous solution which has separated is rendered alkaline by means of potassium carbonate, and the precipitated base is taken up in ether. The excess of ether is distilled and the base which remains behind is converted into its hydrochloride.

The hydrochloride of para-propylamino-benzoic acid alpha-pyrrolidino-beta-hydroxypropyl ester melting at 167° C. is obtained in a good yield.

Example 3

20 grams of para-butylamino-benzoic acid ethyl ester and 20 grams of 1-pyrrolidino-propane-diol-(2.3) are heated for 3 hours at 120° C.–130° C. with a small quantity of sodium methylate solution of 5 percent strength. The reaction product is worked up as described in Example 1. There are obtained 15 grams of the hydrochloride of para-butylamino-benzoic acid alpha-pyrrolidino-beta-hydroxypropyl ester melting at 170° C.–172° C.

Example 4

22 grams of para-butylamino-benozic acid ethyl ester and 20 grams of diethylamino-propane-diol-(2.3) are heated for 3 hours at 110° C.–120° C. with 2 cc. of sodium methylate solution of 5 percent strength. The residue is worked up as described in Example 1. 16 grams of the hydrochloride of para-butylamino-benzoic acid alpha-diethylamino-beta-hydroxypropyl ester are obtained in the form of a crystalline powder which, when recrystallized from methanol and ether, melts at 122° C.–124° C.

Example 5

15 grams of para-isopropylamino-benzoic acid ethyl ester and 15 grams of 1-diethylamino-propane-diol-(2.3) are heated in an oil bath for 3–4 hours at about 120° C. with a small quantity of sodium methylate solution of 5 percent strength. The reaction product is then worked up, and the hydrochloride of para-isopropylamino-benzoic acid alpha-diethylamino-beta-hydroxypropyl ester melting at 103° C.–105° C. is obtained.

Example 6

20 grams of para-diethylamino-benzoic acid ethyl ester and 20 grams of 1-dimethylamino-propane-diol-(2.3) are heated for 4 hours at 120° C. in an oil bath with 2 cc. of sodium methylate solution of 5 percent strength. The excess of 1-dimethylamino-propane-diol-(2.3) is distilled, and the residue is worked up as described in Example 1. The hydrochloride of para-diethylamino-benzoic acid alpha-dimethylamino-beta-hydroxypropyl ester melting at 136° C.–138° C. is obtained in a good yield.

Example 7

18 grams of ortho-butylamino-benzoic acid ethyl ester and 18 grams of 1-dimethylamino-propane-diol-(2.3) are heated for 2 hours at 120° C. with 2 cc. of sodium methylate solution of 5 percent strength. The excess of 1-dimethylamino-propane-diol-(2.3) is distilled, and the product is further treated as described in Example 1. The hydrochloride of ortho-butylamino-benzoic acid alpha-dimethylamino-hydroxypropyl ester melting at 116° C.–118° C. is obtained.

Example 8

50 grams of para-nitro-benzoic acid ethyl ester and 50 grams of 1-dimethylamino-propane-diol-(2.3) are mixed with 5 cc. of sodium methylate solution of 5 percent strength, and the mixture is heated for 2 hours at 120° C. The excess of 1-dimethylamino-propane-diol is distilled, and the residue is taken up in ethyl acetate and shaken with dilute acetic acid, the acetic acid solution is separated, rendered alkaline with potassium carbonate, shaken with ether, the ethereal solution is dried, and the excess of ether is distilled. There remains para-nitro-benzoic acid alpha-dimethylamino-beta-hydroxypropyl ester, and the latter is converted by means of alcoholic hydrochloric acid into the corresponding hydrochloride. After recrystallization from a mixture of alcohol and ether the product melts at 180° C.–182° C.

20 grams of the hydrochloride so obtained are dissolved in water and the solution is hydrogenated with palladium and hydrogen. After the calculated quantity of hydrogen has been taken up, the catalyst is separated by filtration with suction, and the filtrate is concentrated under reduced pressure. There remains behind the hydrochloride of para-aminobenzoic acid alpha-dimethylamino-beta-hydroxypropyl ester which, when recrystallized from a mixture of alcohol and ethyl acetate, melts at 93° C.–94° C.

10 grams of the hydrochloride of para-aminobenzoic acid alpha-dimethylamino-beta-hydroxypropyl ester thus obtained are dissolved in 10 cc. of methanol and the solution so obtained is mixed with 3 grams of propionaldehyde. The mixture is allowed to stand for 1 hour, diluted with methanol and hydrogenated with palladium and hydrogen. As soon as the absorption of hydrogen ceases, the catalyst is separated by filtering with suction, and the filtrate is concentrated under reduced pressure. The residue is dissolved in water, and the solution is rendered alkaline with potassium carbonate and shaken with ether. The ethereal solution is dried and the ether is distilled. Parapropylamino-benzoic acid alpha-dimethylamino-beta-hydroxypropyl ester melting at 77° C. remains behind as a residue. The hydrochloride melting at 110° C.–112° C. is obtained by means of alcoholic hydrochloric acid.

Example 9

The corresponding para-propylamino-benzoic acid alpha-amino-beta-hydroxy-propyl ester as described in the preceding examples, is obtained by reacting para-nitrobenzoic acid ethyl ester with 1-dibenzylamino-propane-diol-(2.3), reducing the product to form para-aminobenzoic acid alpha-dibenzylamino-beta-hydroxypropyl ester, reacting the latter with propionaldehyde, and reducing the reaction product with palladium and hydrogen, whereby the benzyl groups are split off at the same time.

Instead of alkylating with an aldehyde followed by reduction, the alkylation of the amino group may be brought about with the usual alkylating agents, for example with dimethyl sulfate.

Example 10

20 grams of para-ethylamino-benzoic acid ethyl ester and 20 grams of 1-pyrrolidino-propane-diol-(2.3) are heated for 2 hours at 120° C. with a small amount of potassium methylate solution of 5 percent strength. After cooling the reaction product, it is further treated as described in Example 1. The hydrochloride of para-ethylamino - benzoic acid alpha - pyrrolidino - beta - hydroxypropyl ester melting at 194° C. is obtained in a good yield.

Example 11

30 grams of para-propylamino-benzoic acid ethyl ester and 30 grams of 1-benzylmethyl-aminopropane-diol-(2.3) are heated for 3 hours at 120° C. with 5 cc. of a solution of sodium methylate of 5 percent strength. After cooling, the contents of the flask are taken up in ethyl acetate, and shaken first with dilute acetic acid and then with dilute hydrochloric acid. The hydrochloric acid solution is rendered alkaline by means of potassium carbonate and the precipitated base is taken up in ethyl acetate. The dried ethyl acetate solution is evaporated. The residue so obtained is neutralized with alcohol and hydrochloric acid, diluted with methanol, and hydrogenated with palladium and hydrogen. As soon as the absorption of hydrogen is complete, the catalyst is separated by filtering with suction, and the filtrate is evaporated. The hydrochloride of para-propylaminobenzoic acid alpha-methylamino-beta-hydroxypropyl ester melting at 135° C.–137° C. is obtained as a residue.

Example 12

25 grams of para-butylaminobenzoic acid ethyl ester and 25 grams of 1-benzylmethyl-aminopropane-diol-(2.3) are heated for 2 hours at 120° C. with a small amount of sodium methylate solution of 5 percent strength. After cooling, the contents of the flask are taken up in ethyl acetate and shaken with dilute hydrochloric acid. The hydrochloric acid solution is rendered alkaline by means of potassium carbonate and the precipitated base is taken up in ethyl acetate. The dried ethyl acetate solution is evaporated. The residue so obtained is neutralized with alcohol and hydrochloric acid. The hydrochloride of para-butylamino-benzoic acid alpha-benzylmethylamino-beta-hydroxy-propyl ester melting at 186° C.–188° C. is obtained.

Example 13

The hydrochloride obtained according to Example 12 is reduced in the manner described in Example 11, whereby the hydrochloride of para-butylamino-benzoic acid alpha-methylamino-beta-hydroxy-propyl ester melting at 148° C.–150° C. is obtained.

Example 14

50 grams of para-butylamino-benzoic acid ethyl ester and 50 grams of 1-dibenzylamino-propane-diol-(2.3) are heated for 2 hours at 120° C. with 5 cc. of sodium methylate solution of 5 percent strength. The reaction product is taken up in ether and first shaken with acetic acid. The acetic acid solution is separated and the ethereal solution is shaken with dilute hydrochloric acid. During this shaking the hydrochloride of para-butylaminobenzoic acid alpha - dibenzylamino - beta - hydroxypropyl ester precipitates in the form of an oil. The oily hydrochloride is separated, diluted with 200 cc. of methanol and hydrogenated with palladium and hydrogen. When the absorption of hydrogen ceases, the catalyst is separated by filtering with suction, and the filtrate is concentrated under reduced pressure. The hydrochloride of para - butylamino - benzoic acid alpha - amino - beta-hydroxy-propyl ester remains behind.

Example 15

60 grams of para-nitro-benzoic acid ethyl ester are heated for 2 hours to 100° C.–120° C. with 60 grams of 1-dibenzylaminopropane-diol-(2.3) and 10 cc. of sodium methylate solution of 5 percent strength. The para-nitrobenzoic acid alpha-dibenzylamino-beta-hydroxy-propyl ester obtained is converted into the hydrochloride and hydrogenated in an alcoholic solution at 60° C. with Raney nickel and hydrogen. When the absorption of hydrogen has come to a standstill, 1 mol of butyraldehyde is added and the hydrogenation is continued at the same temperature as named above. The alcoholic solution is then filtered with suction and evaporated. As an oily residue there remains the hydrochloride of para-butylamino-benzoic acid alpha-dibenzylamino-beta-hydroxypropyl ester which is then dissolved in methanol and the solution obtained is hydrogenated with palladium and hydrogen. The alcoholic solution is filtered with suction and concentrated. The residue is taken up in water and the base is set free with potassium carbonate; the base soon solidifies to form crystals and after the recrystallization from ethyl acetate it melts at 114° C.–116° C. By a neutralization with alcoholic hydrochloric acid there is obtained the hydrochloride of para-butylaminobenzoic acid alpha - amino - beta - hydroxy - propyl ester melting at 191° C.–193° C.

Example 16

40 grams of para-butylamino-benzoic acid ethyl ester and 40 grams of 1-cyclohexyl-benzylaminopropane-diol-(2.3) are heated for 2 hours to 120° C. with 5 cc. of sodium methylate solution of 5 percent strength. The reaction product is taken up in ethyl acetate and dilute acetic acid, and the whole is then shaken with dilute hydrochloric acid. The hydrochloric acid solution is rendered alkaline by means of potassium carbonate and then shaken out with ethyl acetate. After the ethyl acetate has been distilled off, the residue is neutralized with alcoholic hydrochloric acid, and hydrogenated in methanol with palladium as a catalyst. As soon as the reduction is complete, the methanol is distilled off. The hydrochloride of para-butylaminobenzoic acid cyclohexylamino-beta-hydroxy-propyl ester melting at 137° C.–139° C. is obtained.

Example 17

20 grams of para-propylaminobenzoic acid ethyl ester and 20 grams of 1-piperidino-propane-diol-(2.3) are heated for 2 hours to 120° C. with 3 cc. of sodium methylate solution of 5 percent strength. The reaction product is taken up in ether and the solution is shaken with dilute acetic acid. The acetic acid solution is separated, rendered alkaline with potassium carbonate and extracted with ether. The ethereal solution is washed with water and evaporated. The residue which remains is neutralized with alcoholic hydrochloric acid. During this neutralization the hydrochloride of para-propylamino-benzoic acid alpha-piperidino-beta-hydroxy-propyl ester crystallizes. After recrystallization from alcohol, the compound melts at 188° C.–190° C.

This application is a continuation-in-part of application Serial No. 263,513, filed December 26, 1951.

We claim:

1. A member selected from the group consisting of a compound of the general formula

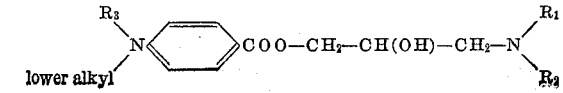

in which $R_1$ and $R_2$ are each a radical selected from the group consisting of hydrogen, lower alkyl, benzyl, cycloalkyl and further radicals wherein $R_1$ and $R_2$ taken together with $-N<$ form pyrrolidino and piperidino, and in which $R_3$ is selected from the group consisting of hydrogen and lower alkyl, and the acid addition salts of the above compounds.

2. An acid addition salt of a compound represented by the general formula

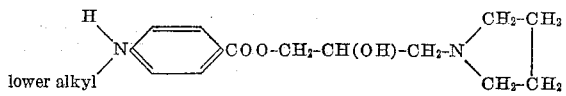

3. A compound of claim 2 wherein the acid addition salt is the hydrochloride.

4. An acid addition salt of a compound represented by the general formula

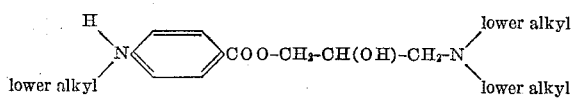

5. A compound of claim 4 wherein the acid addition salt is the hydrochloride.

6. An acid addition salt of a compound represented by the general formula

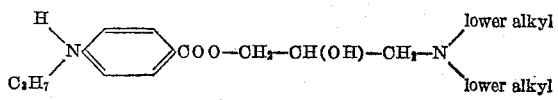

7. An acid addition salt of p-n-propylamino-benzoic acid alpha-dimethyl-amino-beta-hydroxy-propylester.

8. The hydrochloride of para-n-propylaminobenzoic acid alpha-dimethyl-amino-beta-hydroxy-propylester.

9. The hydrochloride of para-isopropylaminobenzoic acid alpha-diethyl-amino-beta-hydroxy-propylester.

10. The hydrochloride of para-n-propylaminobenzoic acid alpha-pyrrolidino-beta-hydroxy-propylester.

11. The hydrochloride of para-n-butylaminobenzoic acid alpha-pyrrolidino-beta-hydroxy-propylester.

12. An acid addition salt of para-n-butylaminobenzoic acid alpha-diethyl-amino-beta-hydroxy-propylester.

13. The hydrochloride of para-n-butylaminobenzoic acid alpha-diethyl-amino-beta-hydroxy-propylester.

References Cited in the file of this patent
UNITED STATES PATENTS

| | | |
|---|---|---|
| 2,442,721 | Cope | June 1, 1948 |
| 2,456,556 | Cope | Dec. 14, 1948 |
| 2,596,156 | Krimmel | May 13, 1952 |
| 2,662,888 | Clinton et al. | Dec. 15, 1953 |
| 2,662,889 | Clinton et al. | Dec. 15, 1953 |

OTHER REFERENCES

Einhorn et al.: Liebigs Annalen, vol. 371, pp. 142–161 (1909).